(12) United States Patent
Pokharel et al.

(10) Patent No.: US 9,087,541 B1
(45) Date of Patent: Jul. 21, 2015

(54) PROCESSING SERVO DATA FROM TWO OR MORE READ TRANSDUCERS CO-LOCATED ON A SLIDER

(71) Applicant: Seagate Technology LLC, Cupertino, CA (US)

(72) Inventors: Puskal Prasad Pokharel, Edina, MN (US); Riyan Mendonsa, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/296,706

(22) Filed: Jun. 5, 2014

(51) Int. Cl.
  *G11B 21/02* (2006.01)
  *G11B 5/60* (2006.01)

(52) U.S. Cl.
  CPC .................. *G11B 5/6005* (2013.01)

(58) Field of Classification Search
  CPC .... G11B 5/6005; G11B 5/59633; G11B 5/54; G11B 21/106; G11B 5/5526; G11B 5/5547; G11B 27/3027; G11B 20/1803
  USPC ............... 360/135, 75, 49, 48, 77.05, 77.08, 360/78.14
  See application file for complete search history.

(56) References Cited

U.S. PATENT DOCUMENTS

| | | | |
|---|---|---|---|
| 5,729,408 A | 3/1998 | Kikitsu | |
| 5,812,338 A * | 9/1998 | Ogasawara et al. | 360/77.08 |
| 6,298,459 B1 * | 10/2001 | Tsukamoto | 714/746 |
| 7,564,656 B2 | 7/2009 | Gurney et al. | |
| 7,715,140 B2 * | 5/2010 | Chu et al. | 360/53 |
| 7,843,661 B2 * | 11/2010 | Schell et al. | 360/77.08 |
| 8,023,392 B2 | 9/2011 | Ling et al. | |
| 8,630,051 B2 | 1/2014 | Nonaka et al. | |
| 8,693,123 B1 * | 4/2014 | Guo et al. | 360/49 |
| 8,711,517 B2 | 4/2014 | Erden et al. | |
| 2013/0335843 A1 | 12/2013 | Santoso et al. | |
| 2014/0002923 A1 | 1/2014 | Cherubini et al. | |

OTHER PUBLICATIONS

File History for U.S. Appl. No. 14/296,716.

* cited by examiner

*Primary Examiner* — Nabil Hindi
(74) *Attorney, Agent, or Firm* — Hollingsworth Davis, LLC (57) ABSTRACT

Servo data of one or more tracks of a disk are collected using first and second read transducers co-located on a slider. Redundant portions of the servo data collected by the first and second read transducers are compared, and at least part of the servo data validating or corrected based on comparing the redundant portions.

20 Claims, 9 Drawing Sheets

PROCESSING SERVO DATA FROM TWO OR MORE READ TRANSDUCERS CO-LOCATED ON A SLIDER

BACKGROUND

Hard disk drives have become a dominant persistent data storage medium for computers since their introduction in the 1950's. The storage capacity of hard disk drives has steadily increased over the years while cost per unit of storage has decreased. For example, areal density of the magnetic disks has doubled every two to four years without significant increase in per-unit cost. As a result, hard disk drives continue to have advantages over competing storage technologies such as solid-state drives at least in terms of price per unit of storage.

New magnetic storage technologies are being developed to maintain this rate of areal density growth of hard disk drives. Some of these technologies include heat-assisted magnetic recording (HAMR), bit-patterned recording (BPR), shingled magnetic recording (SMR), and two-dimensional magnetic recording (TDMR). For these technologies, increased areal density will likely result in reduced track pitch, such that reading back data from the tracks becomes more challenging.

SUMMARY

Various embodiments described herein are generally directed to methods, systems, and apparatuses that facilitate processing servo data from two or more read transducers co-located on a slider. In one embodiment, methods, apparatuses, and computer-readable media facilitate collecting servo data of one or more tracks of a disk using first and second read transducers co-located on a slider. Redundant portions of the servo data collected by the first and second read transducers is compared, and at least part of the servo data validating or corrected based on comparing the redundant portions.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is related to systems, methods, and apparatuses utilizing magnetic readers with multiple read sensors for reading magnetic recording media, e.g., hard disks. In various embodiments described below, the multiple read sensors are used to facilitate more efficiently and/or accurately perform servo positioning. These embodiments use the multiple read heads to read multiple servo marks and/or user data to provide enhanced positioning response.

Generally, current hard disk devices utilize a read/write head (also referred to as a slider, write head, record head, etc.) with a single read transducer for reading data. Multiple read/write heads may be used in the hard drive, e.g., separate read/write heads positioned at top and bottom surfaces of one or more magnetic disks, each read/write head having a single read transducer. New architectures are being proposed that use more than one read transducer co-located on a read/write head. The multiple read transducers are used to read nearby tracks on a recording media that may be recorded at a decreased track spacing compared to current recording architectures (e.g., perpendicular recording media). These architectures may also employ multiple writers, although the present embodiments are independent of the type or number of write transducers.

Technologies such as heat assisted magnetic recording (HAMR) and bit patterned media (BPM) are being developed to increase areal density beyond what is current possible with perpendicular architectures. Another technique to increase storage capacity, known as shingled recording, utilizes drive architectures different from the ones in use today, but may be implemented using existing perpendicular media and conventional (e.g., non-HAMR) read-write heads. Shingled recording involves writing tracks that overlap part of previously written tracks. The write head includes features such as high field strength and sharp corner-edge field that can result in narrower tracks.

Whether areal density is increased using HAMR, BPM, shingled writing, or some other technique, existing read transducers may have difficulty reading back these narrower tracks. For example, shrinking the read transducers in a cross-track direction may decrease signal-to-noise ratio. As a result, two-dimensional magnetic recording (TDMR) or multi-signal magnetic recording (MSMR) is proposed to facilitate reading back data from narrower tracks using a read transducer that may be wider than an individual track, and may use multiple transducers co-located on a slider.

Conventional magnetic recording is sometimes categorized as a one-dimensional (1-D) architecture, even though a magnetic recording surface is, in principle, a two-dimensional (2-D) system. For example, grains on a conventional media surface are not formed based on specific direction assumptions, and performance of the magnetic grains does not depend which direction is along-track and which direction is cross-track. Conventional magnetic recording systems generally constrain an inherently 2-D system to 1-D system in attempt to reduce system cost and complexity.

For example, a 1-D system utilizes individually accessed tracks, which allows for a single read head, single write head, and simplified controller functionality. As a result of this, a 1-D system attempts to minimize inter-track interference, which can increase decoding errors. In contrast, a 2-D system may be designed to assume that multiple tracks may be read at once. A 2-D system may require more sophisticated decoding, but allows relaxing some constraints on erase bands, transducer width, etc.

Even in a confirmation where read transducers are not larger than the written tracks, a multiple-read-transducer arrangement may have benefits. The use of two read transducers can increase the data rate of read operations. The signals read by adjacent tracks can also be jointly decoded to reduce the effects of cross-track interference, skew, etc. For purposes of the following discussion, multiple-read-transducer data storage devices described herein may use read transducers that are smaller than, larger than, or the same as the written data tracks. Further, the number of read transducers may be more than two.

Figure 1:
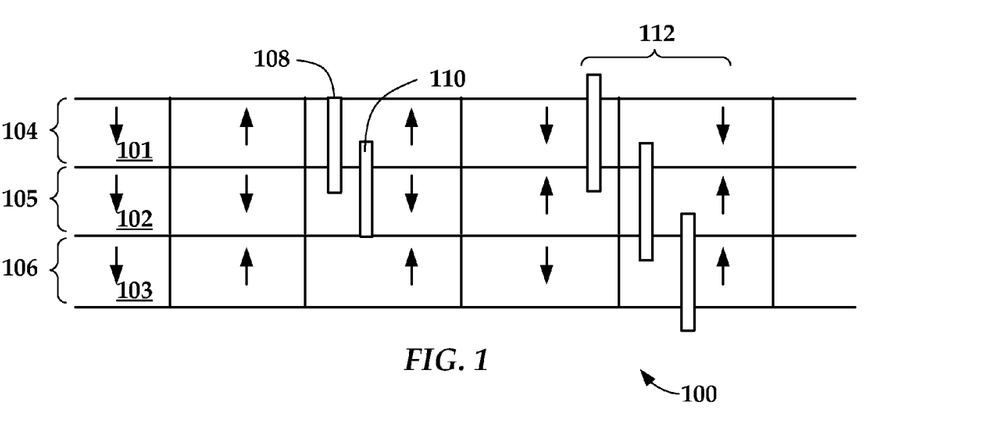
FIG. 1 is a block diagram illustrating reading of two tracks according to an example embodiment.

In reference now to FIG. 1, a block diagram illustrates reading of two tracks according to an example embodiment. Bits 101-103 are shown written in respective tracks 104-106 on a magnetic media surface 100. Although the bits 101-103 are shown aligned to each other from track-to-track, this is not required. The bits 101-103 may be user data or servo data, e.g., data written during manufacture of the disk that provides location data for seeking and tracking. While not shown here, the tracks 104-106 may be separated by regions in between the tracks where no data is recorded. These so-called erase bands or guard bands may have a single magnetic orientation to which the bands were set at manufacture, and reduce adjacent track erasure, crosstalk, etc. Some technologies such as shingled writing may have a number of tracks written together without guard bands. It will be understood that the embodiments described herein need not be limited to shingled tracks/media, and the concepts may be equally applicable to other track writing technologies, such as perpendicular, HAMR, and BPM.

The arrows within the bits 101-103 represent magnetic orientations that will be sensed as ones or zeros by a reader, e.g., by read transducers 108 and/or 110. The read transducers 108, 110 (also referred to herein as "readers") may include magnetoresistive transducers, such as giant magnetoresistance (GMR) sensor, tunneling magnetoresistance (TMR) sensor, etc. Generally, these types of read transducers include layers of magnetic and non-magnetic materials that change resistance in response to local magnetic fields. A current is passed through the sensor while the media moves underneath. The resulting signal is used to read bits on the tracks 104, 105.

In some embodiments, a width of the read transducers 108, 110 may be significantly wider than the tracks, such that the read transducers 108 will read signals from at least two adjacent tracks. For example, both read transducers 108 and 110 will read at least partially from both tracks 104 and 105. The signals from the read transducers 108, 110 may be processed using a two-dimensional decoding algorithm, where the individual track signals are determined from a combination of the signals from both transducers 108, 110.

A TDMR/MSMR device may use other read transducer arrangements than what is shown for transducers 108, 110. For example, read transducer 110 may be shifted down so as to cover track 105 fully and track 106 partially. In another example, the read transducers 108, 110 may have a width that is the same or less than the tracks 104-106, and may operate centered or off-center over the tracks 104-106. More than two read transducers may be used, as indicated by transducer array 112. All of the transducers in array 112 are centered over the respective tracks 104-106, and therefore overlap two adjacent tracks. In other embodiments, the read transducers of array 112 may have a width that is the same as or less than a single recorded track.

Figure 2:
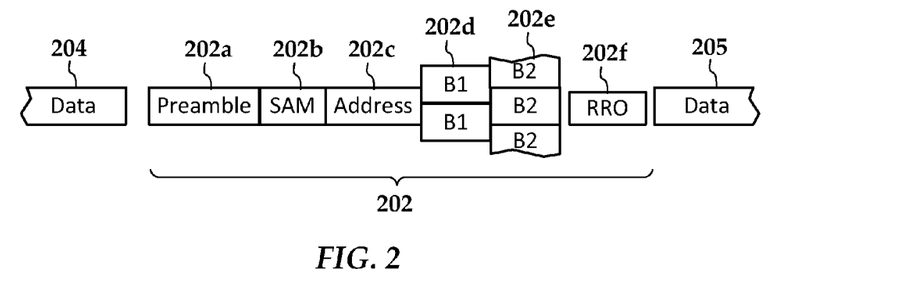
FIG. 2 is a block diagram illustrating a servo pattern according to an example embodiment.

The present disclosure relates to determining track location of the read/write during tracking or seeking operations. Generally this involves the use of servo patterns interspersed on tracks of the disk. The servo patterns (also referred to as servo marks, servo wedges, servo sectors, etc.) are written during manufacture and are prevented from being altered during use of the device. The servo patterns include data that, among other things, facilitates identifying current track/sector, correcting tracking and timing errors, and correcting for runout. An example of a servo pattern 202 is shown in FIG. 2.

The servo pattern 202 is located between a preceding data sector 204 and a following data sector 205 of a track. The data sectors 204, 205 store user data, and present disclosure may be used with any type and arrangement of data sectors. The illustrated servo pattern 202 includes a preamble 202a, servo address mark (SAM) 202b, servo address 202c, position error sensor (PES) fields 202d, 202e, and one or more repeatable runout (RRO) fields 202f. The preamble 202a is a known magnetic pattern that is read back as a signal. The SAM 202b also includes a known pattern of bits that are read following the preamble 202a. Together, the preamble 202a and SAM 202b allow a read/write channel to positively determine that the beginning of the servo pattern 202 has been detected, and facilitates synchronizing the servo signal to read the subsequent data stored in the servo pattern 202. The SAM 202b may also include a servo index mark (SIM), which in some configurations is a SAM placed at a first sector of a track and provides information regarding a single rotation of the disk.

The address field 202c includes a track ID pattern (e.g., Gray code) that identifies the track in which the servo pattern 202 is located. The fields 202d, 202e are burst fields that are used to determine a position error signal. For example, the burst fields 202d, 202e may facilitate controlling alignment and seek movements of the read/write head. The RRO fields 202f also facilitate proper alignment of the read/write heads on a track by correcting for known defects in the shape of the disc. It should be noted that the illustrated servo pattern 202 is provided for purposes of illustration and not limitation, and many pattern variations are possible.

The servo pattern 202 may be used in a TDMR and MSMR apparatus, and such an apparatus can realize efficiencies when reading servo data from to multiple readers co-located on a read/write head. In such a case, multiple streams of servo information can be read out by the multiple readers during the same pass over the disk. These multiple streams of information can be used for reliable decoding of servo data. While the concepts shown below utilize a read/write head with two readers, the concepts can be extended for three or more readers per read/write head as well.

It should be noted that the physical tracks, which are defined by the servo patterns, may not be perfectly concentric on the disk. For example, after assembly of disks onto a spindle motor, the pre-written tracks may be eccentric with respect to the drive spindle center. This eccentricity creates a repeatable runout. To account for this, device may define virtual concentric tracks, which may involve offsetting track/sector references while traversing the sector patterns of the virtual track. The amount of change in the reference of every virtual track can be determined during drive calibration process and may be fixed for the life of the drive. In the embodiments discussed below, the tracks may be real or virtual without loss of generality.

Figure 3:
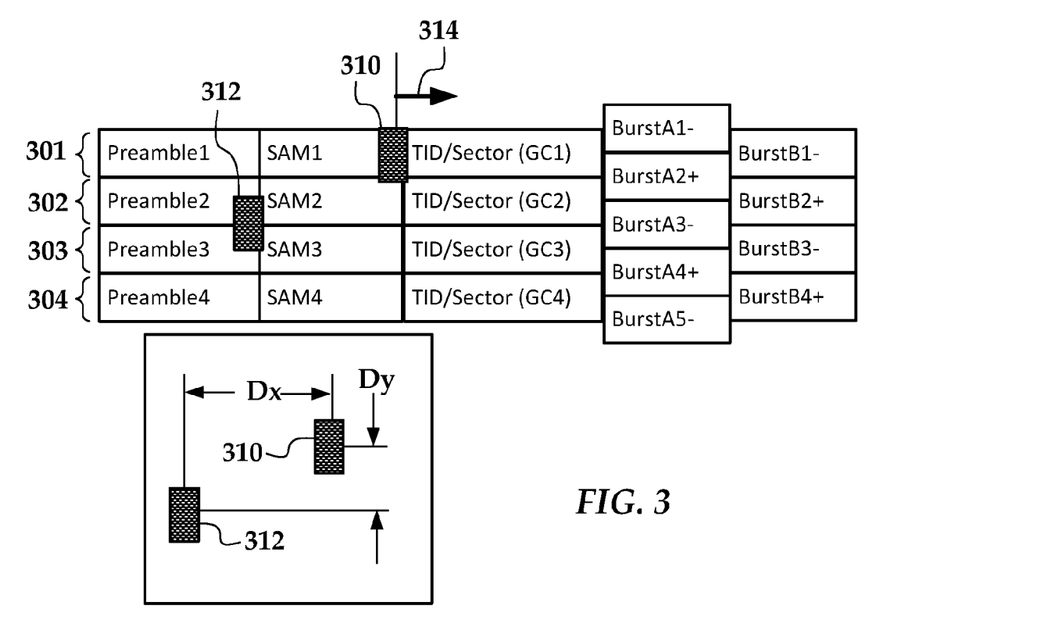
FIG. 3 is a block diagram showing servo patterns being read via a two-reader head according to an example embodiment.

In FIG. 3, a block diagram shows servo patterns being read via a two-reader head according to an example embodiment. As shown in FIG. 3, the two read transducers 310, 312 are part of a common read/write head (not shown) and are positioned over some of servo patterns 301-304 pre-written onto on adjacent tracks of a recording medium. The read transducers 310, 312 may be separated from each other in the downtrack (circumferential or tangential) direction by Dx and in the cross-track (radial) direction by Dy, as indicated in the detail block of FIG. 3. Together Dx and Dy define an offset between the read transducers 310, 312.

Both Dx and Dy may be functions head geometry plus a radial location (changes in downtrack separation due to skew, etc.). Arrow 314 indicates the tangential movement that the read transducers 310, 312 experience relative to the rotating recording medium. As such, read transducer 310 precedes read transducer 312 in time as the servo patterns 301-304 move under the read/write head.

As noted above, the downtrack separation Dx and cross track separation Dy between the read transducers 310, 312 may vary depending on radial location of the read/write head on the disk. The downtrack distance Dx at some radius R may be estimated by gathering data for n-revolutions of the disk. A difference in SAM timestamp (the time at which servo sync is found) between the two readers over all the sectors read during the multiple revolutions can be used to estimate the downtrack separation in time between the two readers for that radius. This can be repeated at multiple radial locations. An example of how downtrack separation may be found is shown in the diagram of FIG. 4.

Figure 4:
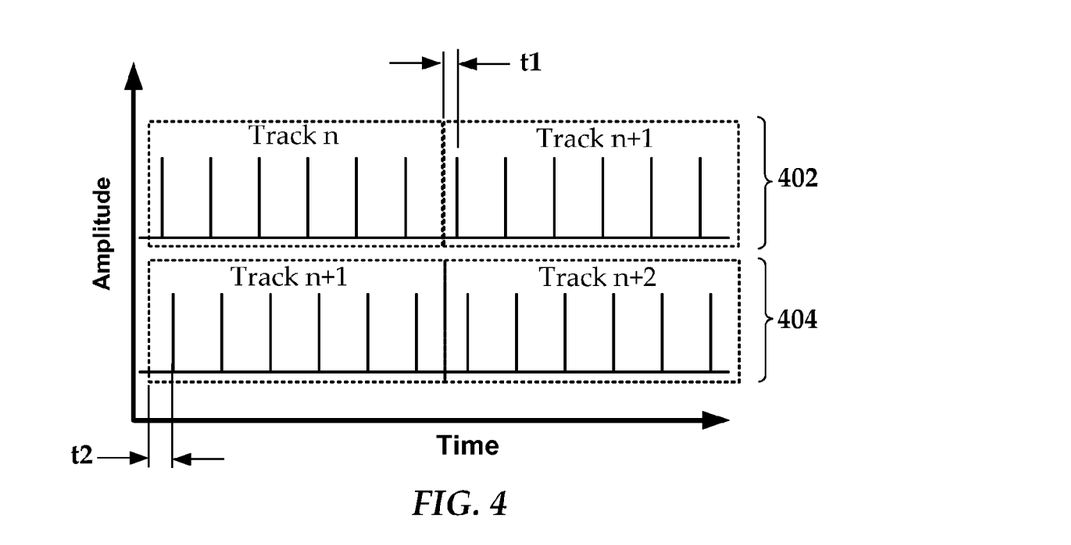
FIG. 4 is a diagram illustrating determination of downtrack separation according to an example embodiment.

In FIG. 4, servo timestamps are represented as pulse waveforms for a leading read transducer 402 and a lagging read transducer 404. The transducers 402, 404 are assumed to be arranged similarly to respective read transducers 310, 312 shown in FIG. 3. The dashed boxes represent tracks, and in this simplified example there are six servo marks per track. It is assumed there is a reference time can be used as a beginning time for each track. Here it is represented as an arbitrary time to which the left edges of the dashed boxes are aligned. In other arrangements, particular servo marks (e.g., SIM) may be used to define start of tracks.

This example assumes the read transducers 402, 404 traverse the tracks in increasing order, and so track n+1 is the first track that will be read by both read transducers. Transducer 402 reads track n+1 at time offset t1 from the start of the track. Transducer 404 reads track n+1 at time offset t2 from the start of the track. As such, the downtrack separation between the read transducers 402, 404 for this track is t2-t1. A similar procedure can be performed for subsequent tracks, and the results averaged. This can be repeated at other radii R until a general function of Dx versus R can be obtained.

A similar procedure can be used to determine the cross track separation Dy. For example, the PES values are read from the each sector mark by the two readers over the multiple revolutions and over all the sectors. These values can be combined to estimate the cross-track separation in time between the two readers for that radius. As with the estimation of downtrack separation, the estimated cross track value could be an average of the separation values obtained over the revolutions and over the sectors, and then repeated at other radii.

As noted above, the procedure for determining Dx and Dy can be performed at a number of radial locations. This can be used to determine Dx and Dy as functions of radial location r, Dx(r) and Dy(r). For example, an interpolation, curve fit, etc. of the measured values may be used to obtain a functional relationship. These functions Dx(r) and Dy(r) can be used in a number of ways described below, such as increasing the robustness of reading the track ID/Gray code, determining correlation between reader signals, etc.

With the continual increase in areal density, pattern quality (defect rate, signal-to-noise ratio, etc.) may deteriorate. This can lead to, among other things, an increase in errors encountered when trying to read track ID fields of the servo marks. This can lower manufacturing yields of the hard disk drives. Current drives generally do not implement error-correction decoding for reading track ID, although some track ID error correction schemes have been proposed. Using the redundancy in the Gray code along with redundant or near-duplicate information obtained from the two readers, a robust track ID detection algorithm can be implemented, either with or without other error correction measures.

Figure 5:
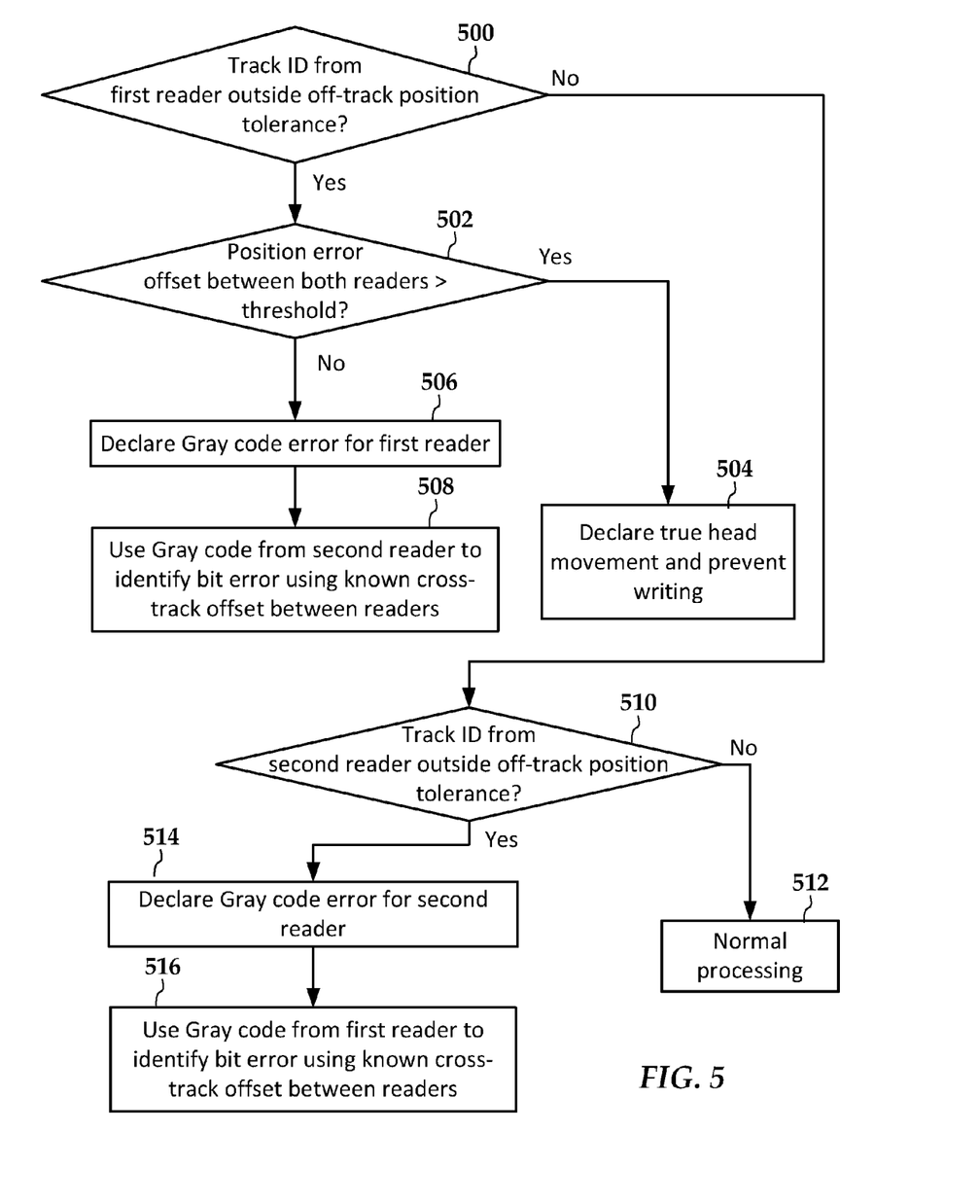
FIG. 5 is a flowchart illustrating a procedure for correcting track ID errors according to an example embodiment.

In reference now to FIG. 5, a flowchart illustrates a procedure for correcting track ID errors according to an example embodiment. In the following description, the first and second readers may correspond to crosstrack adjacent readers such as readers 310 and 312 shown in FIG. 3. However, the implementation in FIG. 5 is not limited to readers that are located over immediately adjacent tracks as shown in FIG. 3, or to the specific leading/lagging relationship shown in FIG. 3. For example, the concepts may apply to readers that are over non-adjacent tracks, e.g., first and second readers over first and second tracks, where a third track lies between the first and second track.

At decision block 500, it is determined whether the track ID read from the first reader is outside of a predetermined off-track tolerance. For example, if the reader is transitioning from one track to an adjacent track, it would expect the Gray code of the track ID to change by one bit. A change of some number of bits greater than one in the Gray code between subsequent tracks may cause the track ID to be outside the allowable tolerance. If this type of Gray code error is found, it is determined at block 502 whether offset between the first and second readers matches the known (calibrated) offset. If this is the case, the out-of-range track ID may be due to a positioning error (e.g., response to shock) and not a data reading/encoding error of the Gray code. As such, true head movement is declared at block 504 and further writing is prevented. Otherwise, a Gray code error for the first reader is declared at block 506, and the Gray code from the second reader is used to identify the bit in error using the known cross-track offset between the two readers, as indicated at block 508. The identified bit error may be used in correcting the error, thereby correctly identifying the track ID.

If, at block 500, the track ID from the first reader is within the off-track position error tolerance, it is then determined at block 510 whether the track ID from the second reader is also within the off-track position error tolerance. If so, the system proceeds with normal processing of the servo information as shown at block 512, as blocks 500 and 510 have confirmed that there is no track ID error. While not shown, the PES offset between the first and second readers may also be checked to ensure they match an expected calibrated value in this case. In either event, the system may use the average PES of the two readers translated by the known cross-track offset between the two as the final PES.

If the outcome of decision block 510 is that the track ID from the second reader is outside the off-track position error tolerance (e.g., the offset between readers do not match the expected calibrated value), a Gray code error for the second reader is declared as shown at block 514. At block 516, the Gray code from the first reader is used to identify the bit in error using the known cross-track offset between the two readers8. The identified bit error may be used in correcting the error, thereby correctly identifying the track ID. The estimated position may also be corrected for both tracks based on one or both burst fields.

The system may set a limit on how many bits to correct to avoid over-correction. The likelihood of two-bit errors is significantly lower than one-bit error. So the system may decide to only correct up one bit and if two or more bits don't match, the system may declare the error not correctible and prevent data writing. This takes into account that there is a known indeterminate bit. The indeterminate bit refers a bit that may change between two adjacent tracks, or more generally multiple number of bits that may change within a certain number of tracks within a known distance from the current track. The intermediate bit or bits may be ignored and not counted as an erroneous bit or bits.

Figure 6:
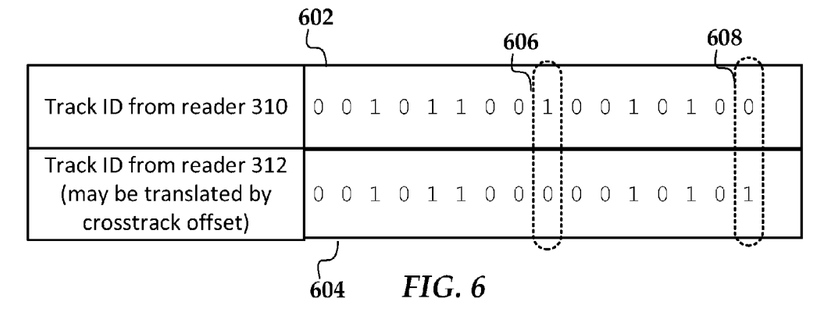
FIG. 6 is a chart a chart showing one-bit error correction using redundant data according to an example embodiment.

In reference now to FIG. 6, a chart shows a case where a one-bit error is corrected using redundant data according to an example embodiment. A first track ID 602 is read by the read transducer 310, and a second track ID 604 is read by the read transducer 312, where the read transducers 310, 312 are arranged over adjacent tracks as shown in FIG. 3. The read transducers 310, 312 may be over non-adjacent tracks, in which case the track ID from one of the read transducers 310, 312 may be translated by the crosstrack offset between readers, The illustrated track IDs 602, 604 are consecutive Gray codes, e.g., should differ from one another by only one bit. All other bits other than transition bits 608 are the same between the tracks, and as such are redundant, e.g., should not change between respective first and second servo marks from which they are read. The highlighted bits 606 are identified as erroneous and can be corrected. The transition bits 608 are known to be in in transition between adjacent tracks (the aforementioned indeterminate bit) and differences between these bits can be ignored. Comparison of the redundant bits (e.g., bits other than 608) can be used to identify erroneous bits 606.

Once the track IDs 602, 604 have been corrected, the final PES may be generated as the average PES of the two readers translated by the known cross-track offset between the two readers. Or the system may instead choose a favored reader based on the other information available about the reader regarding it performance (e.g., noise performance over the servo burst part of the pattern, etc.). The system may use a combination, e.g., use an average where both readers are deemed equally reliable, otherwise use only the data from the more reliable reader, or use a weighted average, giving more weight to the more reliable reader.

Depending on the track ID numbering scheme and the cross track spacing between read transducers, some number of bits of the track ID (and other binary data fields) may be assumed redundant. For example, because the example track ID is a Gray code, two successive values track IDs differ in only one bit, the transition bit. So if one or more bits (other than the transition bits) from two adjacent track IDs do not match, an error can be determined. Similarly, position error signals contain some redundant information that can be used to determine, correct, and verify errors. The burst fields are used to determine position by measuring relative magnitudes of burst fields that are offset from one another. Because the geometric relation between the read transducers on the slider is fixed and changes in a predicable way at a given radial location, it is possible to derive the position error for one read transducer based on the position error of the other read transducer. As such, at least some parts of the PES signals are redundant to one another, and can be used as a cross-check to validate or correct each another.

Using redundant track ID/Gray code information from two readers provides a higher degree of confidence when a head unexpectedly moves from one servo sector to the next, since both readers have to move by the same amount. This can prevent falsely correcting an apparent error in reading the track ID/Gray caused by real head movement, since this would cause both the readers to create the same apparent code error. The information from one reader can correct the information on the other reader, so the system will have a high level of confidence that both servo information values are valid. A controller can always choose the servo information from a favored head based on some rule (e.g., average performance of one reader may be better than the other) or the controller can use an intelligent combination (e.g., average, weighted or not) of the two servo information values, adjusted by the known offset between the two readers.

Combining the information from two readers can improve track ID/Gray code correction algorithms should they be implemented. One of the concerns with these error correction algorithms has been the possibility of correcting for a false error (e.g., unexpected head movement between two sectors creating an observer sector error that will look like an error in reading the Gray code). Using the information from the additional head will provide an extra amount of security to prevent these somewhat rare but serious false corrections. For example, a Gray code bit may be corrected if the error correction algorithm and the proposed redundancy algorithm both agree.

Other servo data may also be more accurately processed due to the availability of two readers having a known separation. As noted above, PES values may be processed together with track ID/Gray code in determining position of the read/write head. The detection of SAM may also benefit from the use of two readers. There are two methods described below which may be chosen for use in correcting servo data based on, among other things, separation (Dx or Dy) between the readers. For example, during writing, it is desirable for the head to be able to read the servo signal while it is writing in order to not lose format efficiency. As such, this may put an upper limit on Dx in order to maintain desired format efficiency.

Figure 7:
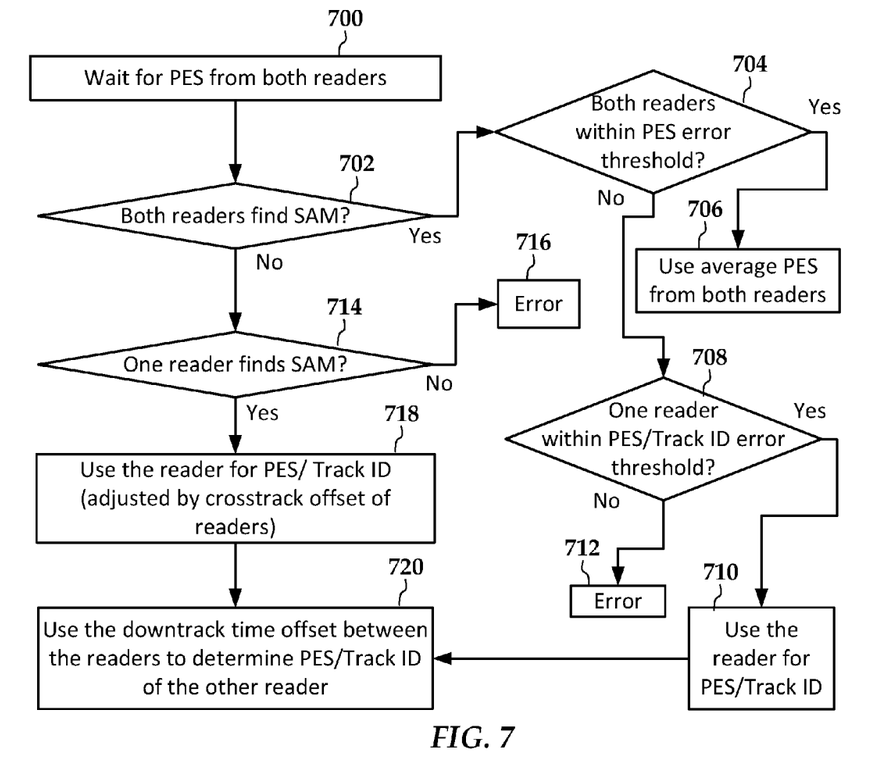
FIG. 7 is a flowchart illustrating a method of utilizing the position error information obtained from two readers according to an example embodiment.

In reference now to FIG. 7, a flowchart illustrates a first method for utilizing the PES information obtained from the two readers. At block 700, the controller waits for the PES information from both readers to be available to compute the combined improved PES. As noted above, this may put a limit on Dx. If Dx is above some amount, the delay waiting for both readers may make it difficult to begin writing once the servo information is processed. If this is the case, then the alternate method shown in FIG. 8 may be used.

If both readers find SAM as determined at block 702, it is then determined at block 704 if both readers are within a set PES error tolerance. If so, the average PES from the two readers is used as shown at block 706. Assuming the reader-to-reader separation is calibrated, the average PES can be translated to the PES for each reader with using known offset.

It is determined at block 708 whether only one reader has Track ID and/or PES beyond a set error tolerance for tracking. If the result of block 708 is affirmative, the reader which is within the TID/PES error tolerance is used as shown at block 710. If both readers are outside the PES error tolerance (block 708 returns negative), an error is declared at block 712. This error may be a head movement error, TID error and/or observer sector error. Error condition at block 712 will prevent a write operation from proceeding.

If the outcome of block 714 is that one of the readers was able to detect SAM, that reader is used for servo control as shown in block 718. If neither reader can find SAM, a SAM not found error as shown at block 716 may be declared. Any further write operations may be prevented from proceeding. This may be followed with another attempt to read the servo data, and possibly at some point (e.g., a number of failed re-attempts) sending an error to the host.

The method in FIG. 7 uses SAM detection as an indicator to choose the best reader (or both readers) for determining PES and track ID for both tracks being read. The SAM detection by the two readers may also be used to increase the accuracy (both mean and variance) of SAM found times. This facilitates making sector-to-sector times more accurate by combining the SAM found times from the two readers (e.g., using the average of the two SAM found times, or the SAM found time coming from the reader with the least expected/measured timing jitter). This information can improve the performance of disk locked clock (DLC) or disk synchronous write (DSW) loops. This can be used for improved clock coherency with the pattern frequency on the disc (e.g., frequency throughout the revolution).

Figure 8:
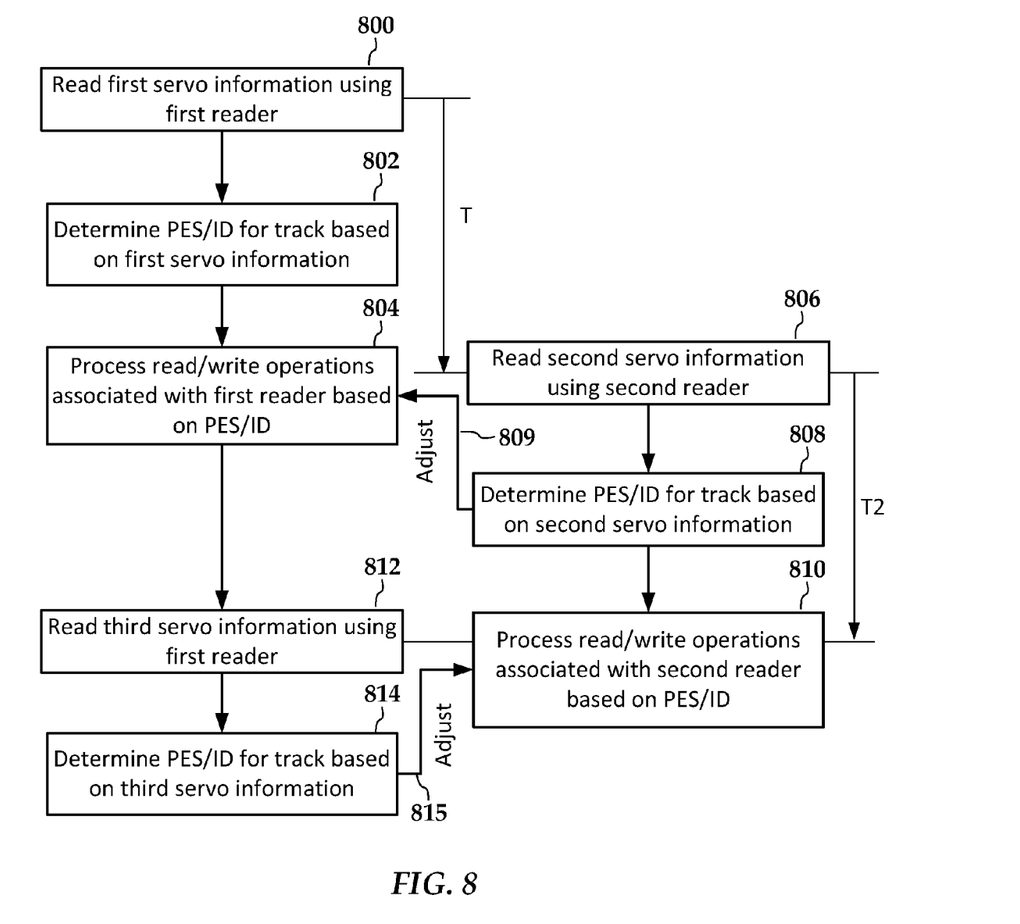
FIG. 8 is a flowchart illustrating a method of processing servo data without waiting for both readers according to an example embodiment.

Because the method shown in FIG. 7 waits at block 700 for servo data from both readers, this may cause a delay in processing servo data for one or both tracks, which may reduce format efficiency depending on the downtrack separation between readers. In FIG. 8, a flowchart illustrates a method according to an example embodiment where servo data is processed without waiting for both readers. First servo mark information is read at block 800 using a first reader. The PES and track ID is determined from the first servo information at block 802, and the controller uses this information and proceeds with read/write operations associated with the first reader at block 804.

When a time T (which corresponds to the downtrack separation Dx) has elapsed after reading the servo information at block 800, second servo information is read using a second reader at block 806. At block 808, PES and/or track ID data is determined based on the second servo information. The previously found track ID from block 802 may be used to assist in the determination at block 808, e.g., by comparing redundant data to validate and/or correct bit errors. As indicated by path 809, the PES and/or track ID data obtained at block 808 may be used to adjust the ongoing read/write operations (e.g., by adjusting head position) for operations of the other reader. The PES and track ID data determined at block 808 may be for the same or different track than what is being processed at block 804. In the either case, appropriate changes can be made to the adjustment data based on Dx and Dy, as described above.

The PES and/or track ID data obtained at block 808 is also shown being used at block 810 for processing read/write operations associated with the second reader, e.g., in parallel with operations associated with the first reader. The operations at block 810 can be adjusted (as indicated by path 815), by subsequent servo data processed by the first reader. This subsequent data is obtained by reading third servo information at block 812 and determining PES and/or track ID based on the third servo information. The separation in time T2 (not shown in figure) between blocks 806, 812 may be the same or different than T.

Referring back to the method shown in FIG. 7, SAM detection by the two readers is used as an indicator of which of two or more readers are likely to be reading valid data. Those SAM-based indicators then assist in determining PES and track ID. The detection of SAM by two readers may also be used to increase in robustness of SAM detection itself, e.g., by combining the two SAMs. With the continual increase in areal density, SAM pattern quality (defect rate, signal-to-noise ratio, etc.) can deteriorate, in which case detecting SAM with acceptable performance may be more difficult.

The additional (e.g., redundant) data read from the two servo sectors can be utilized to obtain an acceptable tradeoff between false alarm rate and detection rate of SAM. For example, an existing channel decoding circuit may use various schemes to allow certain number of bits (e.g., less than 2 out of a 9 bits in the SAM/SIM pattern) to be in error and still declare SAM found. There is also an option to qualify a number of preamble bits immediately preceding the SAM bits in order to declare SAM found. It has been demonstrated that checking the preamble bits only if SAM is detected imperfectly (number of flawed bits less than the programmed tolerance) provides an acceptable trade-off between detection and false alarm rate.

Figure 9:
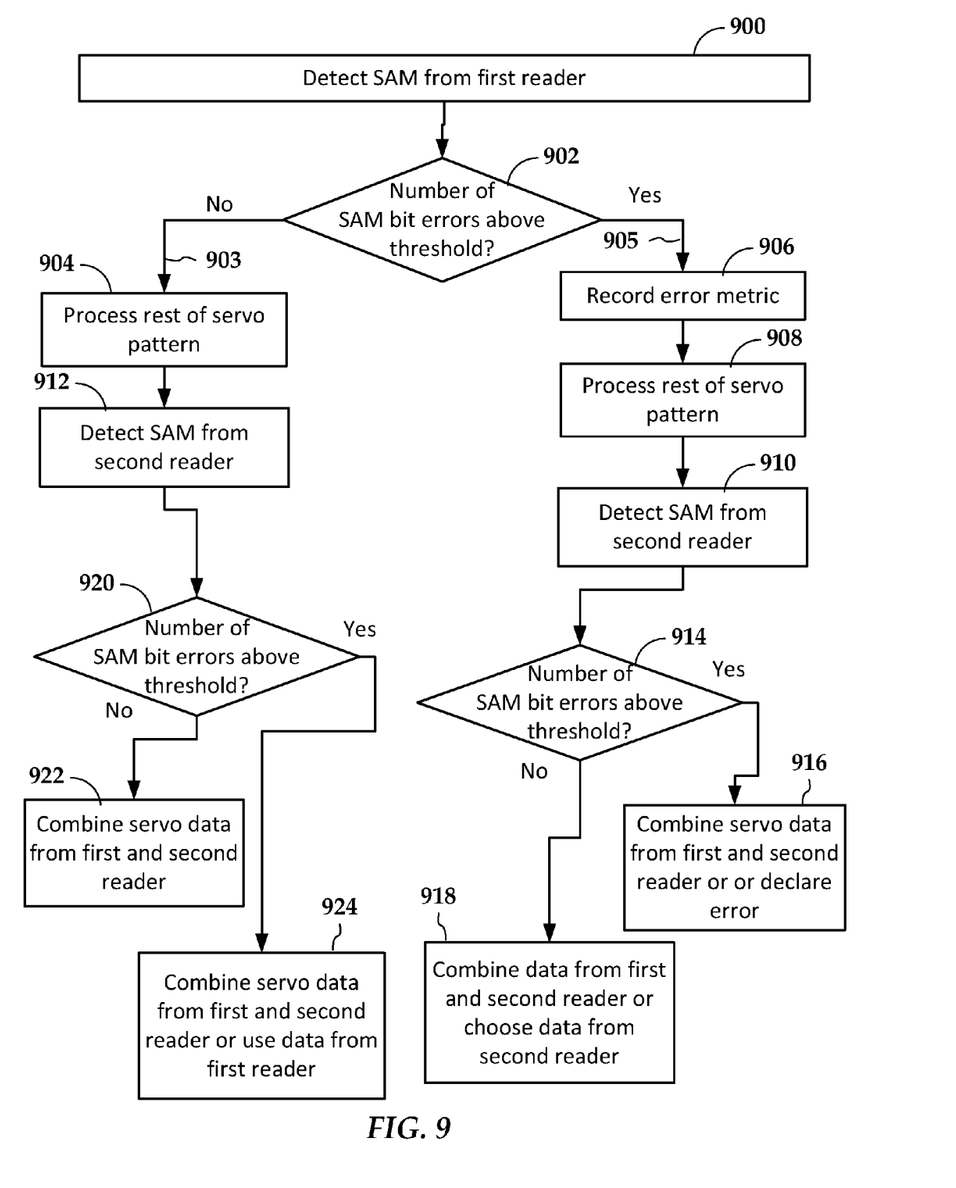
FIG. 9 is a flowchart illustrating a method of using servo address marks read from two readers according to an example embodiment.

Another option available is setting a threshold on the Euclidean distance (or other measure of bit errors) between the analog-to-digital converter (ADC) samples from the servo read back signal and the ideal samples expected for the SAM bits. In such a case, the confidence level to which the SAM bits are read can be used to determine a confidence level that is applied other data of the servo wedges. In FIG. 9, a flowchart illustrates a method of using SAM read from two readers according to an example embodiment. The SAM data may be used to interpret and/or correct other servo data, such as track ID, PES, etc.

At block 900, a first reader detects SAM, and a condition is tested and recorded at block 902. This condition relates to whether or not SAM is found with a number of bits above a threshold. For example, if the threshold is zero bit errors, then path 903 would be taken if zero bit errors (detection with high confidence) were found. Path 905 would be taken if more than zero bit errors (e.g., 1 or 2 bits in error) were found. In the latter case, a metric of the error is recorded at block 906. The error metric may include Euclidean distance, Hamming distance, etc. As shown at blocks 904, 908, further processing of the rest of the servo pattern proceeds in both cases, e.g., based on a conventional, single reader, strategy.

After a certain amount of time the servo information from the second head arrives, as shown at blocks 910, 912. If the confidence of SAM detection with the first head was low as determined at block 902 (e.g., SAM detected with a number of bits in error above a threshold and/or with a high error metric), SAM may be required to be detected only with high confidence (zero allowed bit errors or very low error metric) for the second head. This is shown at block 914, where a SAM bit error threshold is tested. As indicated at block 916, if SAM error is above the threshold (shown at block 916) an error is declared (e.g., SAM not found) for one or both sectors, or the data from both servo sectors may be being combined if such a combination would improve the result. For example, redundant information may be used to correct errors that would not normally be correctable if read alone. In other cases, the redundant information may be used perform a partial check or correction, e.g., determining some number of most significant bits.

If the SAM bit error tested at block 914 is below the threshold, the system may choose to combine the servo information from both the readers, or pick the one with the best SAM detection confidence for that sector, as indicated in block 918. While not shown, the system may also pick the one of the two based on an average better performance of one of the heads. In such a case, the first reader may be selected at block 918 due to better overall performance, even though the second reader shows better performance in this instance. In any of the cases shown in FIG. 9 where a combination of data is used, the performance/confidence indicators can still be used to weight the combination appropriately.

If it was determined at block 902 that the first SAM bit errors were below the threshold, a similar sequence is performed as shown in blocks 920, 922, and 924 of the flowchart after the SAM from the second reader is detected at block 912. If it is determined at block 920 that the second reader detected SAM with high confidence (bit errors at or below threshold), servo data may be combined for both readers as shown at block 922. If the second reader detected SAM with bit errors above the threshold, servo data may be combined for both readers, or just the first reader data may be used, as shown at block 924. In either of these blocks 922, 924, the system may also choose to use information from one reader and ignore the servo information from the other for reasons given above, e.g., one head has better average performance.

It should be noted that a third condition (not shown) may result from blocks 902, 920, 914 in which the number of bit errors exceeds an allowable limit. In such a case, further processing of the servo sector may be skipped and an error declared (e.g., SAM not found). Or, previously read servo information, along with information regarding offset between readers, can be used to estimate the servo data, including the SAM. For example, the last detected SAM from another reader may be close enough in time to be used as a time reference so that servo processing can be attempted even if SAM is not found based on the time offset between servo signals of the two readers. In such a case, if a sequence of subsequent servo bits match an estimated servo field (e.g., track ID) that is expected based on the track ID read of the last detected servo mark, the SAM timing data may be updated based on the estimated servo field, and other servo data such as track ID and PES may be processed regardless of the SAM error. Similarly, a SAM not found error of a previously read sector can be corrected. For example, if the sampled signals from both readers a stored, a later found SAM can be found to look back to previously read data based on an expected time offset.

Generally, the methods and apparatuses described above reduce the probability of unusable servo sectors. Such techniques allow SAM (and other servo data) to be detected with low confidence from one reader so long as SAM from another reader is with higher confidence. In such a case, to declare "SAM not found," the pattern quality under both readers would have to be sufficiently poor. Further, as will be described below, user data detected by two readers may facilitate maintaining at least current tracking position even if servo data can't be read reliably for the current track.

Servo data takes a non-negligible amount of disk space in a hard disk drive, and even with this overhead it does not have a high sampling rate. This limits density, ability to follow a track and to detect sudden shocks or head deviation from the track. As described below the user data may be used to estimate and correct a position error of read transducers on different tracks. This may be used to supplement the servo data, e.g., may detect a shock event or other perturbation that occurs between reading of servo wedges that causes the readers to mis-track.

Generally, while user data on the hard drive has meaning to the host, the user data is somewhat random from the perspective of the storage system. Further, the encoding algorithms, such as run length limited encoding, are designed to ensure magnetic transitions occur within a certain maximum distance. Due to the nature of the data and the encoding, the correlation between user data recorded on two adjacent tracks would be expected to be fairly low. However, the correlation between data in the region between tracks, e.g., guard bands, will tend to be high, as these regions would be expected to have minimal changes in magnetic orientation, having not been purposely written to.

In recognition of this, signals from multiple readers can be analyzed to determine correlation of the signals between the readers. This correlation value can give the knowledge of the head position and/or indicate when there is a sudden change in the correlation, e.g., a shock event that happens between servo marks. An example of using correlation for two readers is shown in the block diagram of FIG. 10. Generally, readers 1008 and 1010 are shown over tracks 1004 and 1006, respectively, in two different states of alignment 1000, 1002. The first alignment state 1000 represents a maximum alignment between readers 1008, 1010 and tracks 1004, 1006.

Figure 10:
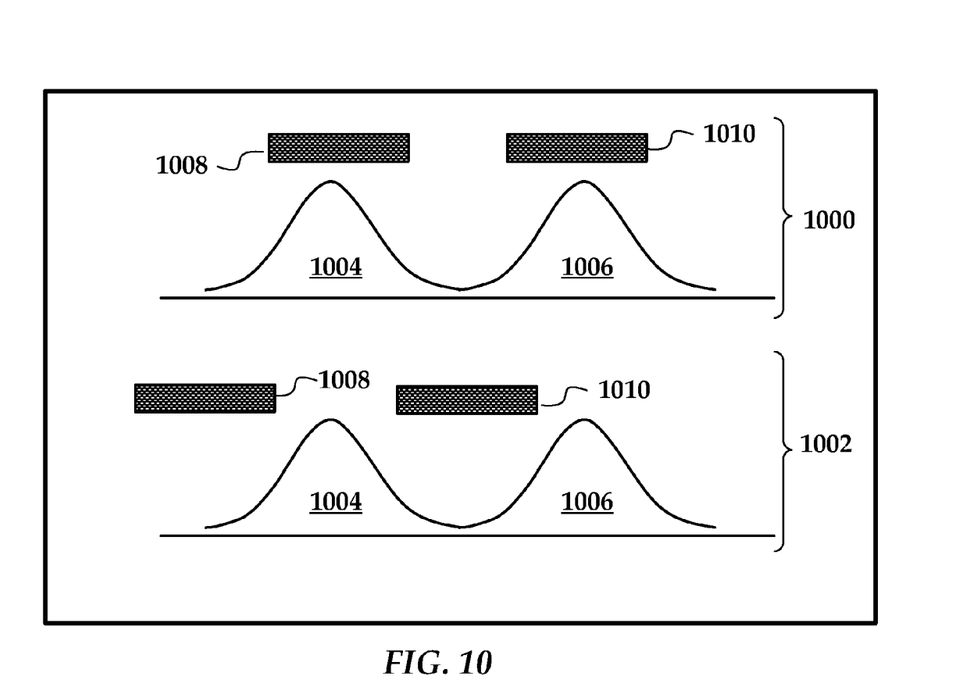
FIG. 10 is a block diagram illustrating the use of correlation between two readers for tracking according to an example embodiment.

In a first example, the curves over the tracks 1004, 1006 may be considered to be an amplitude (e.g., root mean squared) of the signal measured by the readers 1008, 1010. Thus, by looking at just the amplitude of the first and second reader signals, it may be possible to determine that a misalignment has occurred. However, such indication may not provide a directional indicator. As will be described below, a correlation between data measured by the readers 1008, 1010 may indicate both misalignment and direction of misalignment.

In a second example, the curves over the tracks 1004, 1006 may be considered to be an amount of variability of the magnetic flux (and thus variability of the signal) in that cross track location. Because the data in the tracks 1004, 1006 are likely to be different, the variability of the tracks is highest over the center of the tracks 1004, 1006. As such, in alignment state 1000, correlation between the readers 1008, 1010 is low.

Figure 11:
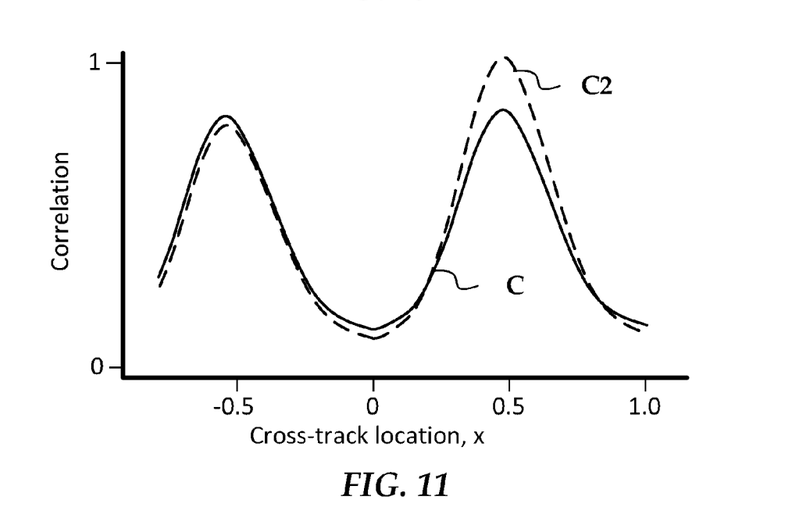
FIG. 11 is a graph showing how correlation between two read heads may vary based on cross-track location according to an example embodiment.

In the second alignment state 1002, the readers 1008, 1010 are in minimal alignment between the tracks 1004, 1006. There would likely be no data recorded in the guard bands, and so there would be relatively few transitions of magnetic flux when reading the guard bands. As such, the variability in these guard band regions is low, and so correlation between the readers 1008 is high. In FIG. 11, a graph shows how correlation between two read heads may vary based on cross-track location, x. Generally, whole number values of x (e.g., 0.0, 1.0) represent middle of the tracks, and middle of the guard bands would be at −0.5, 0.5, 1.5, etc.

The correlation value in FIG. 11 is shown as a scaled value between 0 (minimal correlation) and 1 (maximum correlation). The correlation value may be calculated in a number of ways. For example, if $s1(t)$ and $s2(t)$ are ADC values encoded from first and second readers at an instant of time, correlation as a function of time may be expressed as $c(t)=S_{max}-\text{abs}\{s1(t)-s2(t)\}$, where $S_{max}$ is a maximum signal level. The function $c(t)$ may be summed/integrated over a period of time (e.g., moving time window) and scaled to obtain a correlation indicator C that is between 1 and 0, and changes depending on cross track location of the readers. The correlation between the two readers can provide an indicator to the system how centered the slider is over the tracks. As seen in FIG. 11, the value of C is at a minimum where the reader-to-track alignment is the highest. The illustrated examples in FIGS. 10 and 11 assume the readers are separated or slightly overlap, such that the majority of the readers are not on the same track. These examples also assume the readers are separated by exactly one track (or nearly so).

In addition to determining misalignment of readers from a track, correlation between reader signals may also be used to determine in which cross track direction the readers are offset. In reference again to FIG. 10, at alignment state 1002, both readers may pick up partials signal (e.g., crosstalk) from track 1004 that may be correlated, assuming downtrack separation is known and accounted for. Partial signals from track 1006 may still be detected by reader 1010, as well as signals from a track (not shown) to the left of track 1004 being read from reader 1008. These signals will be uncorrelated to each other as well as uncorrelated to partial signals detected from track 1004.

When the readers 1008, 1010 lose cross track alignment from state 1000, there may be a detectable increase in correlation when the time delayed signals are correlated, e.g., $c2(t)=Smax-abs\{s1(t)+s2(t+\delta)\}$, where $\delta$ is a delay time between the first and second readers passing over a selected point on the track. The value $\delta$ is a function of downtrack separation of the readers and linear (tangential) speed of the media under the readers. The function $c2(t)$ is integrated/summed and scaled to obtain C2. As seen in FIG. 11, the difference between C and C2 can indicate a direction in which the head is moving, as the higher peak of C2 at x=0.5 is caused by common crosstalk caused by a track positioned between the two readers, e.g., track 1004 in state 1002 of FIG. 10 is contributing to both readers 1008, 1010.

It may also be seen by inspection of FIG. 10 that the amplitude of track 1006 as detected by both readers 1008, 1010 will decrease as the readers move to the left. The amplitude of track 1004 as detected by both readers 1008, 1010 will also decrease as the readers move to the left, however less than the decrease of track 1006. This is because reader 1010 will see an increase in crosstalk from track 1004 that is added to the crosstalk from track 1004 detected by reader 1008. If, instead the commonly detected amplitude of track 1006 increases compared to that of track 1004, then it may be assumed the readers 1008, 1010 have shifted instead to the right.

The above noted changes in signal strength and correlation between multiple readers can be used to detect sudden head deviations from the tracks. This technique can complement servo position detection, leading to an increase in servo format efficiency. For example, if servo is used in conjunction with this method, servo can be used to calibrate the reader spatial spacing using the servo PES bursts for cross track reference and using the sync mark (SAM/SIM) for down track spacing calculation. If correlation or amplitude is being used, the positioning achieved with servo can determine the signal ratios/differences (correlation signal or amplitude signal) required to be met to achieve steady on track following.

Figure 12:
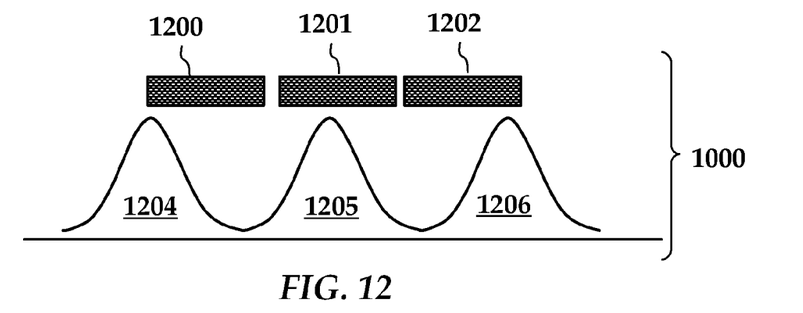
FIG. 12 is a block diagram illustrating the use of correlation between three readers for tracking according to an example embodiment.

In reference now to FIG. 12, a diagram illustrates how correlation data may be used in an apparatus according to an embodiment with three readers 1200-1202 located over three tracks 1204-1206. The three reader case benefits from the existence of middle reader 1201 between the two other readers 1200, 1202 in the cross track direction. The information from the outer two readers 1200, 1202 can be used to center the middle reader 1201 over a track. The center reader can also be used and/or relationships between the center reader and the outer readers can also be utilized.

In one example, an integrated/summed correlation function C can have a similar shape as shown in FIG. 11, except that in this example the time dependent correlation is determined by $c(t)=Smax-abs\{s1(t)-s3(t)\}$, where $s1(t)$ is measured from the first reader 1200 and $s3(t)$ is measured from the third reader 1202. In another embodiment, the signals of the two outer readers 1200, 1202 may be used to stay on track, while reinforcing it with an amplitude variation check of the center reader 1201. This arrangement can determine shock more quickly than using servo alone, or even more quickly than using two readers. In such a case, there is no need to wait for the last reader (which ever of the readers 1200-1202 is furthest downtrack) to collect signal information). The first reader by itself can provide a hint of this information.

In other embodiments, not only are the signals of the outer readers 1200, 1202 compared, but the signal from the center reader 1201 is compared to one or both to improve signal quality. Comparing the center reader 1201 with the others also strengthens directional information of the signal. For example, as described above in relation to FIG. 11, a delay-corrected correlation may indicate which cross track direction the slider is heading if it is moving away from track center. These methods for two and three readers can be extrapolated to systems with higher numbers of readers as well.

Figure 13:
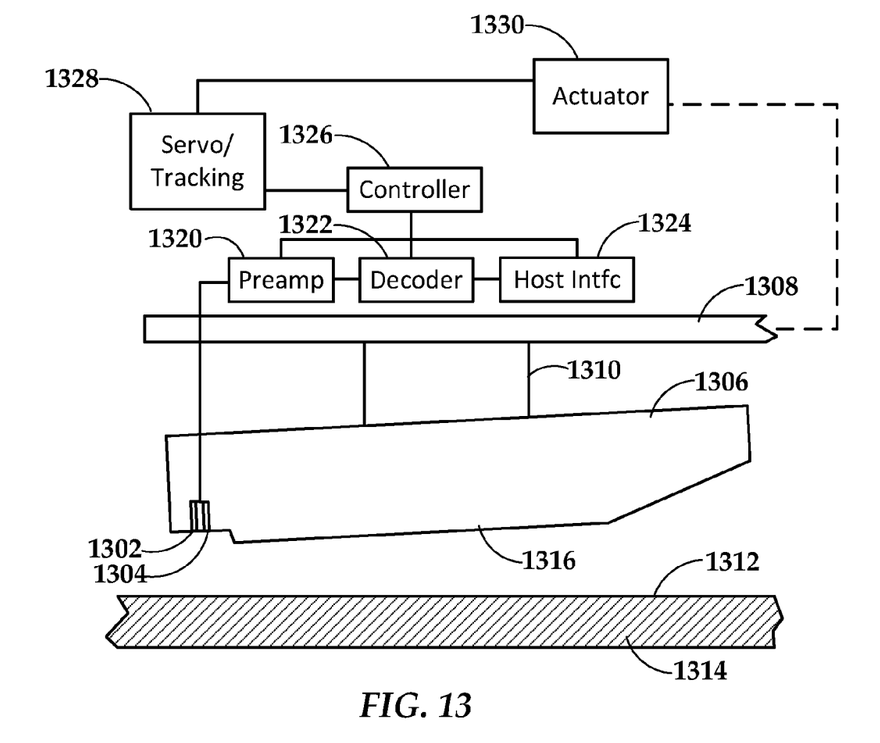
FIG. 13 is a block diagram illustrating an apparatus according to an example embodiment.

The embodiments described above may be employed in a hard disk data storage device. Details of such a device according to an example embodiment are shown in FIG. 13. Generally, two or more read transducers 1302, 1304 (also referred to herein as "readers") are housed at a trailing edge of a slider 1306 (also referred to herein as a "read/write head"). The slider 1306 is coupled to arm 1308 by way of a suspension 1310 that allows some relative motion between the slider 1306 and arm 1308. In addition to the read transducers 1302, 1304, the slider 1306 may include one or more write transducers (not shown), such as a write pole and coil. When the slider 1306 is located over surface 1312 of a magnetic disk 1314, a flying height is maintained between the slider 1306 and surface 1312 by a downward force of arm 1308. This downward force is counterbalanced by an air cushion that exists between the surface 1312 and an air bearing surface 1316 of the slider 1306 when the disk 1314 is rotating.

Changes in local magnetic field caused by the moving disk 1314 induce a change in resistance of the read transducers 1302, 1304. The read transducers are coupled to a preamplifier 1320 that amplifies and conditions the analog signals (which may include a two-dimensional signal) received via signal lines. The amplified signals are used for other processing modules such as decoder 1322. The decoder 1322 determines a digital output from the analog signals, the digital output being used by a host via host interface 1324, as well as other system components such as servo controller/tracking module 1328. The processing of the signals and data is generally managed by a controller 1326, which may include a microprocessor and other logic circuits.

The servo controller/tracking module 1328 includes functional components (e.g., analog or digital circuits, firmware, software) that identify servo data on the disk 1314, process the servo data, and use the data to control an actuator 1330, (such as voice coil motor and/or microactuator) that positions the arm 1308 over tracks on the disk 1314. The servo controller/tracking module 1328 may also include functional components that monitor analog signals or digital signals from the preamplifier 1320 or decoder 1322, e.g., to determine correlation, amplitude, etc. These signals may be associated with both servo data and user data. For example, user data signals may be used to determine cross track position error as described in relation to FIGS. 10-12.

Figure 14:
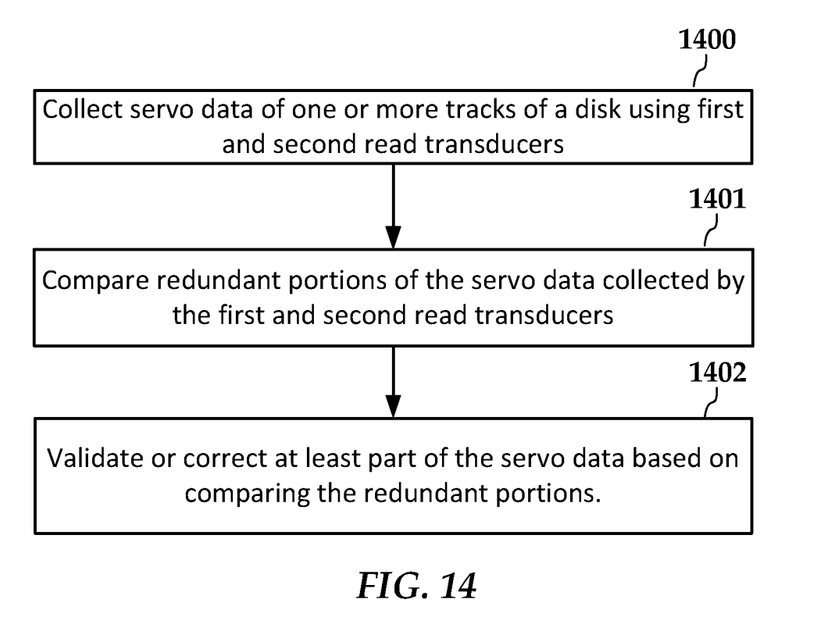
FIGS. 14 and 15 are flowcharts illustrating methods according to example embodiments.

In reference now to FIG. 14, a flowchart illustrates a method according to another example embodiment. The method involves collecting 1400 servo data of one or more tracks of a disk using first and second read transducers. The first and second read transducers are co-located on a slider, e.g., offset from each other by a downtrack and crosstrack distance. Redundant portions of the servo data collected by the first and second read transducers are compared 1401, and at least part of the servo data is validated or corrected 1402 based on comparing the redundant portions.

The servo data may include first and second servo wedges on different tracks, e.g., adjacent or non-adjacent tracks. In one configuration, comparing 1401 the redundant portions of the servo data may involve comparing bits of first and second track IDs of the first and second servo wedges. In such a case, differences between bits that are not Gray code transition bits indicating bit errors in at least one of the first and second track IDs. In another configuration, comparing 1401 the redundant portions of the servo data may involve comparing first and second position error signals of the first and second servo wedges. In such a case, a difference between the first and second position error signals is adjusted by a known offset between the first and second read transducers. The adjusted difference is used to validate or correct position error data of the slider.

Figure 15:
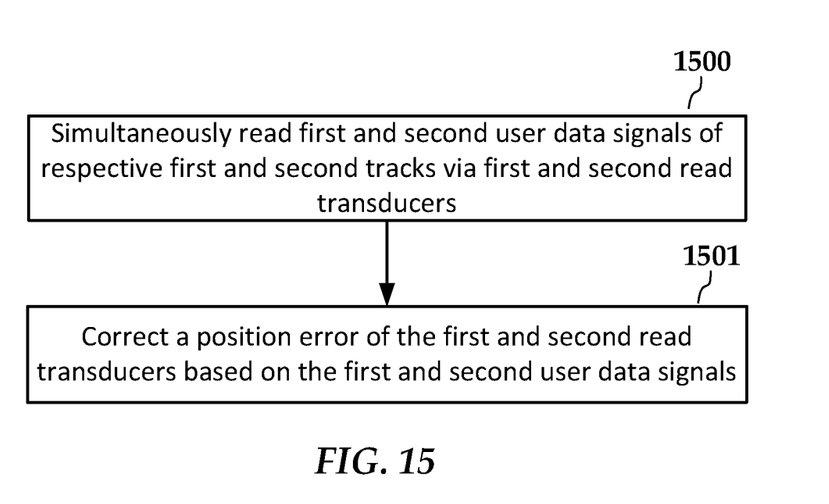

In reference now to FIG. 15, a flowchart illustrates a method according to another example embodiment. The method involves simultaneously reading 1500 first and second user data signals of respective first and second tracks of a disk via first and second read transducers co-located on a slider. A position error of the first and second read transducers is corrected 1501 based on the first and second user data signals. Correcting 1501 the position error may involve determining a correlation between the first and second signal, such that a high value of the correlation indicates a high position error. A third read transducer may be co-located on the slider between the first and second read transducers. In such a case, correcting 1501 the position error may also involve determining amplitude of a third signal read from the third read transducers, a high value of the amplitude indicating a low position error.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   collecting servo data of one or more tracks of a disk using first and second read transducers co-located on a slider;
   comparing redundant portions of the servo data collected by the first and second read transducers; and
   validating or correcting at least part of the servo data based on comparing the redundant portions.

2. The method of claim 1, wherein the servo data comprises first and second servo wedges on different tracks.

3. The method of claim 2, wherein comparing the redundant portions of the servo data comparing bits of first and second Gray codes of the first and second servo wedges, differences between bits that are not code transition bits indicating bit errors in at least one of the first and second Gray codes.

4. The method of claim 2, wherein comparing the redundant portions of the servo data comparing first and second position error signals of the first and second servo wedges, wherein a difference between the first and second position error signals is adjusted by a known offset between the first and second read transducers, the adjusted difference used to validate or correct position error data of the slider.

5. The method of claim 1, further comprising determining an offset between the first and second read transducers based on collecting additional servo data at different radial locations on the disk via the first and second read transducers, the offset used in at least one of comparing the redundant portions of the servo data and validating or correcting the at least part of the servo data.

6. The method of claim 5, wherein the additional servo data comprises a servo address mark, and wherein determining the offset comprises comparing first and second timestamps associated with the first and second read transducers reading the servo address mark to determine a downtrack separation between the first and second read transducers.

7. The method of claim 5, wherein the additional servo data comprises position error data, and wherein determining the offset comprises comparing first and second position error data of adjacent tracks read by the first and second read transducers to determine a crosstrack separation between the first and second read transducers.

8. The method of claim 1, wherein collecting the servo data of one or more tracks comprises reading first and second servo wedges via the respective first and second read transducers, wherein bit errors of respective first and second servo address marks of the first and second servo wedges are used to determine a confidence of other data of the first and second servo wedges.

9. An apparatus comprising:
   a controller capable of being coupled to first and second read transducers co-located on a slider, the controller configured to:
   collect servo data of one or more tracks of a disk via the first and second read transducers;
   compare redundant portions of the servo data collected by the first and second read transducers; and
   validate or correct at least part of the servo data based on comparing the redundant portions.

10. The apparatus of claim 9, wherein comparing the redundant portions of the servo data comparing bits of first and second consecutive Gray codes of first and second servo wedges, wherein differences between bits that are not transition bits indicate bit errors in at least one of the first and second Gray codes.

11. The apparatus of claim 9, wherein comparing the redundant portions of the servo data comparing first and second position error signals of first and second servo wedges, wherein a difference between the first and second position error signals is adjusted by a known offset between the first and second read transducers, the adjusted difference used to validate or correct a position error of the slider.

12. The apparatus of claim 9, wherein the controller is further configured to determine an offset between the first and second read transducers based on collecting additional servo data at different radial locations on the disk via the first and second read transducers, the offset used in at least one of comparing the redundant portions of the servo data and validating or correcting the at least part of the servo data.

13. The apparatus of claim 12, wherein the additional servo data comprises a servo address mark, and wherein determining the offset comprises comparing first and second timestamps associated with the first and second read transducers reading the servo address mark to determine a downtrack separation between the first and second read transducers.

14. The apparatus of claim 12, wherein the additional servo data comprises position error data, and wherein determining the offset comprises comparing first and second position error data of adjacent tracks read by the first and second read transducers to determine a crosstrack separation between the first and second read transducers.

15. The apparatus of claim 9, wherein collecting the servo data of one or more tracks comprises reading first and second servo wedges via the respective first and second read transducers, wherein bit errors of respective first and second servo address marks of the first and second servo wedges are used to determine a confidence of other data of the first and second servo wedges.

16. A non-transitory computer-readable medium storing instructions operable by a processor to perform:

collecting servo data of one or more tracks of a disk using first and second read transducers co-located on a slider;
comparing redundant portions of the servo data collected by the first and second read transducers; and
validating or correcting at least part of the servo data based on comparing the redundant portions.

17. The computer-readable medium of claim 16, wherein the servo data comprises first and second servo wedges on different tracks.

18. The computer-readable medium of claim 17, wherein comparing the redundant portions of the servo data comparing bits of first and second Gray codes of the first and second servo wedges, differences between bits that are not code transition bits indicating bit errors in at least one of the first and second Gray codes.

19. The computer-readable medium of claim 17, wherein comparing the redundant portions of the servo data comparing first and second position error signals of the first and second servo wedges, wherein a difference between the first and second position error signals is adjusted by a known offset between the first and second read transducers, the adjusted difference used to validate or correct position error data of the slider.

20. The computer-readable medium of claim 16, wherein the instructions are further operable to determine an offset between the first and second read transducers based on collecting additional servo data at different radial locations on the disk via the first and second read transducers, the offset used in at least one of comparing the redundant portions of the servo data and validating or correcting the at least part of the servo data.

* * * * *